Sept. 15, 1959 W. GFÖLL 2,903,888
PRESSURE GAGE ATTACHMENT FOR TIRE VALVE STEMS
Filed Jan. 10, 1956
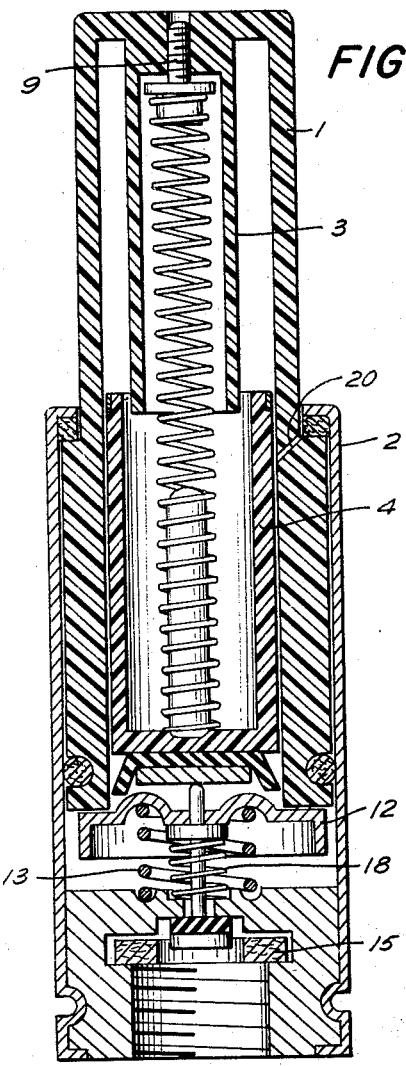
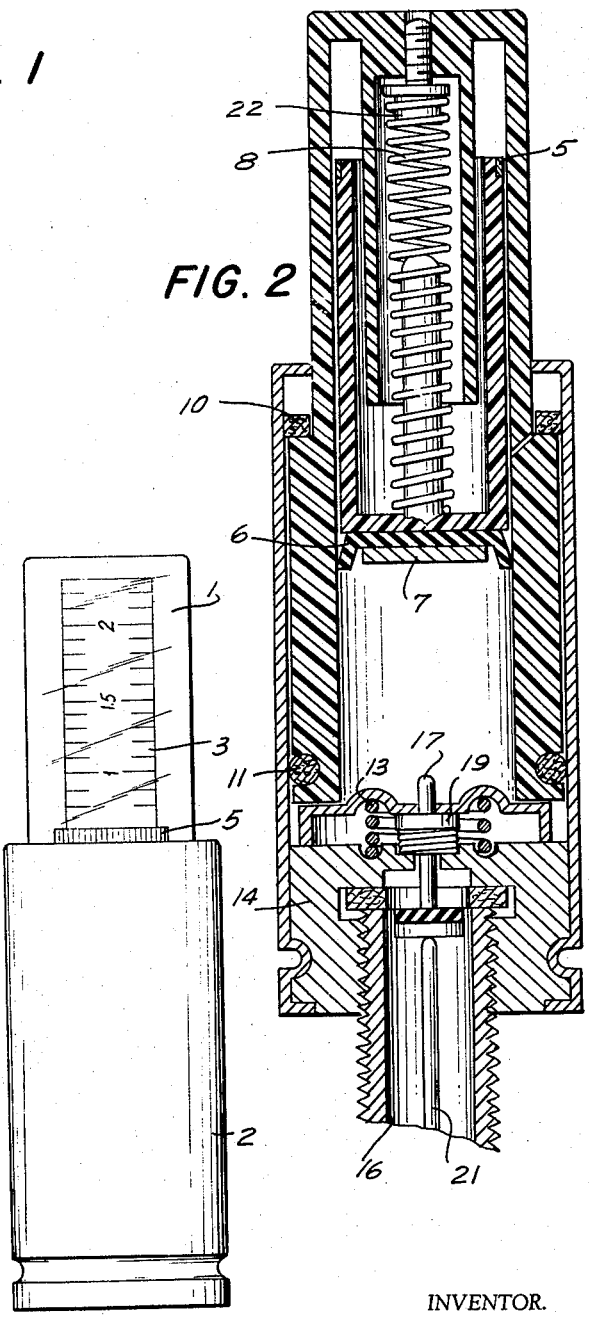
INVENTOR.
WALTER GFOLL
BY MICHAEL S. STRIKER
ATTORNEY United States Patent Office 2,903,888
Patented Sept. 15, 1959

2,903,888

PRESSURE GAGE ATTACHMENT FOR TIRE VALVE STEMS

Walter Gföll, Freiburg im Breisgau, Germany

Application January 10, 1956, Serial No. 558,359

Claims priority, application Germany January 11, 1955

5 Claims. (Cl. 73—146.8)

The present invention relates to a pressure gage attachment for tire valve stems of vehicles, particularly motor vehicles. This pressure gage attachment has for its object to enable the driver to observe continuously the pressure prevailing in the pneumatic tires of his vehicle in the simplest possible manner, without having to connect up a measuring instrument specially every time he wishes to take a reading.

Pressure gage attachments are already known. They are, however, open to objections which prevent their general use in practice. They are not sufficiently simple and reliable in operation and do not ensure an absolutely tight closure of the valve in the event of trouble.

To eliminate said disadvantages it is, therefore, the object of the present invention to provide a valve cap for pneumatic tires of vehicles, constructed as a pressure gage, with means adapted to be depressed to open the valve of the inner tube of a tire and to form a pressure chamber in the valve cap, which comprises in combination a holder sleeve adapted to be fitted on the valve of the inner tube of the tire, a depressable cylindrical cover slidable in said holder sleeve and forming an unperforated closed dust cap and carrying a hollow core sleeve with a scale readable from the outside so that the cylindrical cover also constitutes a measuring cap, a safety valve located in front of the valve of the inner tube of the tire in the path of the air under pressure passing from the dust cap to the measuring cap and its pressure chamber, said safety valve being constructed and arranged so that on being actuated, as soon as it has opened, it participates in the opening of the valve of the inner tube of the tire.

The cylindrical cover is of transparent plastic material and a cup-shaped sleeve is arranged in said cylindrical cover and is slidable like a piston against the action of a spiral spring and the underside of said cup-shaped sleeve facing the valve of the inner tube is subjected to the pressure of air to be determined.

A preferred embodiment and further advantages of the invention are hereinafter described in detail with reference to the accompanying drawing, in which:

Fig. 1 is a longitudinal sectional view of a valve cap according to the present invention, constructed as pressure gage and in inoperative position;

Fig. 2 is a similar view with the cap in measuring position, and

Fig. 3 is a side elevation showing the valve cap in closed position.

The measuring cap illustrated in the figures comprises a cylindrical cover 1 of absolutely transparent plastic material. It forms the upper part of the measuring cap, which is closed all round without any perforations. This cylindrical cover 1 is shiftable in a longitudinal direction, its lower slightly thicker part being guided in a holder sleeve 2 made of metal. On the inner face of the upper wall of the cylindrical cover 1 a sleeve 3, constructed as a core, is fixed. This core sleeve 3 is made of non-transparent or opaque material and carries on its outer surface a measuring scale visible all round as shown in Fig. 3. The scale is marked for example in black and red. The divisions of the scale can at the same time be preferably marked with luminous color so that they can be also read at night without any additional illumination. As the division of the scale extends over the entire periphery of the sleeve 3, the measurement value can be read in any position of the wheel. The scale or its core sleeve 3 cannot become soiled because the core sleeve, as already said, is fixed within the transparent cylindrical cover 1 and, consequently, shut off from air, water and dust. The pressure indication itself is effected by a cup-shaped sleeve 4 actuated like a piston which is pushed upwards in the cylindrical cover 1 as soon as it is subjected to the air pressure to be measured acting on it from below. The diameter of the core sleeve 3 is so chosen that the cup-shaped sleeve 4 does not come into contact with the core sleeve 3 during its longitudinal movement so that wear or damaging of the scale on the core sleeve 3 is avoided.

The cup-shaped sleeve 4 is also made of glass-clear, transparent plastic material and provided at least at its upper edge with a marked ring 5 which is preferably also in luminous color. When taking a measurement only this marked ring 5, for example in red color, appears over the scale and thus indicates the desired reading. The scale itself, however, remains visible above and below the marked ring 5 because the cup-shaped sleeve 4 and also the cover 1 are of transparent material. A packing ring 6 provided with a reinforcement disk 7 may be fitted on the bottom of the cup-shaped sleeve 4. This packing ring 6 can, however, also be omitted.

Inside the core sleeve 3 serving as scale carrier, a spiral spring 8 is provided for measuring and also for returning the cup-shaped sleeve 4 into its zero position, which spring 8 bears at its lower end against the bottom of the cup-shaped sleeve 4 and is at the same time guided in the core sleeve 3 and on a projection extending from the bottom of the cup-shaped sleeve 4. As shown in Figs. 1 and 2, the spiral spring 8 is connected at its upper end to a plate 22 forming a support. In order to compensate the tolerances of the spiral spring 8 in different forms of construction, a set screw 9 is provided in the upper end face of the cover 1, which enables a fine adjustment of the counter-pressure of the spring 8 to be carried out. The set screw 9 is then sealed from the outer side.

In order to seal off the cylindrical cover 1 and the holder sleeve 2 from each other, packing rings 10, 11, for example made of rubber, are provided. The packing ring 10 seals towards the top and prevents dust, water or moisture from penetrating into the interior of the valve cap. The lower rubber ring packing 11 serves as a sliding packing or gland and in turn prevents air under pressure from escaping between the holder sleeve 2 and the cylindrical cover 1 during the taking of a measurement.

Below the cylindrical cover 1 a stamped metal disk 12 is located which fits with its upward bulge in the bore of the cylindrical cover 1. This metal disk 12 is also bent downwards like a flange at its outer edge and thus limits the displacement path of the cylindrical cover 1. The metal disk 12 is perforated to allow the passage of the air under pressure which pushes the cup-shaped sleeve 4 in upward direction against the action of the spiral spring 8 so that the air pressure may be read on the scale 3. Below the metal disk 12 there is also a pressure spring 13 which presses the cylindrical cover 1 in upward direction into its inoperative position.

A screw-threaded member 14 is provided in the lower part of the valve cap, on which member the holder sleeve 2 is air-tightly beaded or rolled. A standard rubber packing 15 is fitted in the screw-threaded member 14 as rear connection. With the aid of packing 15 the valve cap can be screwed on to a standard valve tube 16 of the inner tube of a pneumatic tire, having a known valve 21, so that it is hermetically sealed off from the outer air and acts as an ordinary dust cap. Above the packing 15 there is another safety valve 17 in the screw-threaded member 14, which safety valve 17 is additionally coordinated to the valve cap. The lower part of the screw-threaded member 14 of the valve cap is hermetically sealed off from the upper measuring part of the valve cap by means of a spring 18. If the tire valve 21 should become defective, leakage of air from the lower part of the valve cap to the measuring part of this cap through the valve 17 is impossible.

For measuring the air pressure the valve cap above described operates in the following manner:

The cylindrical cover 1 is pushed downwards by exerting pressure with a finger. The pressure spring 13 is thereby compressed to such an extent that the metal disk 12 bears with its flange on the screw-threaded member 14. At the same time the metal disk 12 during its downward movement carries with it the safety valve 17 by means of an abutment disk 19 rigidly connected with it, so that the actual tire valve 21 is opened. Consequently, air under pressure flows out of the tire through the open valve 17 and the perforation in the metal disk 12 into a measuring chamber formed by the cover 1, and in so doing shifts the cup-shaped sleeve 4 upwards which then, by means of the ring 5 provided on its upper edge, indicates on the scale of the core sleeve 3 the exact pressure value of the tire being tested. After the measurement has been read, the cylindrical cover 1 is returned into its position of rest by the pressure spring 13. The spring 18 again closes the safety valve 17 and hermetically seals it. The spiral spring 8 returns the cup-shaped sleeve 4 into its initial position. A fine bore 20 communicating with the atmosphere serves for rapidly exhausting the air after a reading has been taken.

In the valve cap described the measurement value available for measuring the pressure can be obtained in a wide measurement range by suitable selection of the spiral spring 8. It is, however, advisable to choose a relatively small measuring range, for example one corresponding to that of the scale shown in Fig. 3, in which a millimeter division on the reading scale indicates about one tenth atmosphere of pressure difference. The new valve cap may additionally be provided with a transparent elastic plastic coating which prevents it from becoming dirty on the outer side.

With a construction corresponding to the form of construction described, it is possible, while observing all safety factors, to provide a valve cap which, with a diameter of about 15 millimeters, only has a length of about 40 millimeters and a weight of about 5 to 8 grams, so that this valve cap presents no danger to the driver, vehicle or tires with regard to the centrifugal force produced when travelling at high and maximum speeds. The cap has been expressly so designed that substantially only rotation parts fitting one into the other are required, which can all be produced separately and can be assembled by merely fitting the same together.

Although a preferred embodiment of the invention has been described in detail herein and illustrated in the accompanying drawing, it is to be understood that the invention is not limited to this precise embodiment, particularly with respect to the materials specified in connection therewith, and that various changes and modifications may be effected therein, without departing from the scope or spirit of the invention as defined in the appended claims.

I claim:

1. A combined valve cap and pressure gauge, comprising, in combination, a holder sleeve adapted to be mounted at one end thereof on the valve of the inner tube of a tire; an elongated hollow dust cap having a closed end extending beyond the other end of said sleeve and an open end spaced from the valve of the inner tube of the tire, said cap being mounted for sliding movement in said sleeve between an inoperative position and an operative position in which said open end of said cap is spaced closer to said valve than in said inoperative position; first spring means operatively connected to said cap and tending to keep the same in its inoperative position; safety valve means mounted between said open end of said cap and the valve of the inner tube of the tire for movement between an open position and a closed position, said safety valve means being operatively connected to said cap for movement therewith from said closed to said open position when said cap is moved from said inoperative position to said operative position, said safety valve means adapted to engage said valve of the inner tube of the tire during its movement from said closed position thereof to said open position thereof to open the valve of the inner tube of the tire when in open position so that air under pressure may flow through the valve of the inner tube of the tire and said safety valve into the interior of said dust cap; second spring means engaging said safety valve means and tending to move said safety valve means to said closed position thereof; and pressure indicator means located in the interior of said dust cap for indicating the air pressure in the time when said dust cap is moved to the operating position thereof.

2. A combined valve cap and pressure gauge, comprising, in combination, a holder sleeve adapted to be mounted at one end thereof on the valve of the inner tube of a tire; an elongated hollow dust cap formed from transparent plastic material and having a closed end extending beyond the other end of said sleeve and an open end spaced from the valve of the inner tube of the tire, said cap being mounted for sliding movement in said sleeve between an inoperative position and an operative position in which said open end of said cap is spaced closer to said valve than in said inoperative position; first spring means operatively connected to said cap and tending to keep the same in its inoperative position; safety valve means mounted between said open end of said cap and the valve of the inner tube of the tire for movement between an open position and a closed position, said safety valve means being operatively connected to said cap for movement therewith from said closed to said open position when said cap is moved from said inoperative position to said operative position, said safety valve means adapted to engage said valve of the inner tube of the tire during its movement from said closed position thereof to said open position thereof to open the valve in the inner tube of the tire when in open position so that the air under pressure may flow through the valve of the inner tube of the tire and said safety valve into the interior of said dust cap; second spring means engaging said safety valve means and tending to move said safety valve means to said closed position thereof; an elongated piston mounted for sliding movement in said dust cap and having an end wall facing the open end of said dust cap; and third spring means located between said closed end of said dust cap and said end wall of said elongated piston so that when said dust cap is moved to the operative position thereof and air under pressure passes through said valve of said inner tube of the tire and said safety valve means said elongated piston is moved against the action of said third spring means to indicate the air pressure in the tire.

3. A combined valve cap and pressure gauge, comprising, in combination, a holder sleeve adapted to be mounted at one end thereof on the valve of the inner tube of a tire; an elongated hollow dust cap formed from transparent plastic material and having a closed end extending beyond the other end of said sleeve and an open end spaced from the valve of the inner tube of the tire, said cap being mounted for sliding movement in said sleeve between an inoperative position and an operative position in which said open end of said cap is spaced closer to said valve than in said inoperative position; a hollow cylindrical member integrally formed with said dust cap, being coaxially arranged therewith and projecting from said closed end thereof towards said open end thereof with the free end of said hollow cylindrical member spaced from said open end of said dust cap, the outer surface of said hollow cylindrical member being provided with graduations and being spaced from the inner surface of said dust cap; first spring means operatively connected to said cap and tending to keep the same in its inoperative position; safety valve means mounted between said open end of said cap and the valve of the inner tube of the tire for movement between an open position and a closed position, said safety valve means being operatively connected to said cap for movement therewith from said closed to said open position when said cap is moved from said inoperative position to said operative position, said safety valve means adapted to engage said valve of the inner tube of the tire during its movement from said closed position thereof to said open position thereof to open the valve of the inner tube of the tire when in open position so that the air under pressure may flow through the valve of the inner tube of the tire and said safety valve into the interior of said dust cap; second spring means engaging said safety valve means and tending to move said safety valve means to said closed position thereof; an elongated piston mounted for sliding movement in said dust cap and having an end wall facing the open end of said dust cap and a cylindrical wall engaging with the outer surface thereof the inner surface of said dust cap so as to be guided thereby and the inner surface of said cylindrical wall being slightly spaced from the outer surface of said hollow cylindrical member; and a third spring means located between said closed end of said dust cap and said end wall of said elongated piston so that when said dust cap is moved to the operative position thereof and air under pressure passes through said valve of said inner tube of the tire and said safety valve means said elongated piston is moved against the action of said third spring means to indicate the air pressure in the tire.

4. A combined valve cap and pressure gauge, comprising, in combination, a plug formed with a central opening therethrough and being adapted to be mounted at one end thereof on the valve of the inner tube of a tire; a holder sleeve projecting coaxially with said plug from the other end thereof and being fixedly connected thereto; an elongated hollow dust cap having a closed end extending beyond the other end of said sleeve and an open end spaced from the valve of the inner tube of the tire, said cap being mounted for sliding movement in said sleeve between an inoperative position and an operative position in which said open end of said cap is spaced closer to said valve than in said inoperative position; a perforated plate placed against said open end of said dust cap; first spring means located between said plug and said plate and tending to press said plate against said dust cap and to keep thereby said dust cap in its inoperative position; safety valve means mounted at said central opening of said plug for movement between an open position in which said safety valve means opens said opening and a closed position in which said safety valve means closes said opening, said safety valve means engaging said plate for movement therewith from said closed to said open position when said cap is moved from said inoperative position to said operative position, said safety valve means adapted to engage said valve of the inner tube of the tire during its movement from said closed position thereof to said open position thereof to open the valve of the inner tube of the tire when in open position so that air under pressure may flow through the valve of the inner tube of the tire and said safety valve into the interior of said dust cap; second spring means engaging said plug and said safety valve means and tending to move said safety valve means to said closed position thereof; and pressure indicator means located in the interior of said dust cap for indicating the air pressure in the tire when said dust cap is moved to the operating position thereof.

5. A combined valve cap and pressure gauge comprising, in combination, a plug formed with a central opening therethrough and being adapted to be mounted at one end thereof on the valve of the inner tube of a tire; a holder sleeve projecting coaxially with said plug from the other end thereof and being fixedly connected thereto; an elongated hollow dust cap formed from transparent plastic material and having a closed end extending beyond the other end of said sleeve and an open end spaced from the valve of the inner tube of the tire, said cap being mounted for sliding movement in said sleeve between an inoperative position and an operative position in which said open end of said cap is spaced closer to said valve than in said inoperative position; a hollow cylindrical member integrally formed with said dust cap, being coaxially arranged therewith and projecting from said closed end thereof toward said open end thereof with the free end of said hollow cylindrical member spaced from said open end of said dust cap, the outer surface of said hollow cylindrical member being provided with graduations and being spaced from the inner surface of said dust cap; a perforated plate placed against said open end of said dust cap; spring means located between said plug and said plate and tending to press said plate against said dust cap and to keep thereby said dust cap in its inoperative position; safety valve means mounted at said central opening of said plug for movement between an open position in which said safety valve means opens said opening and a closed position in which said safety valve means closes said opening, said safety valve means engaging said plate for movement therewith from said closed position to said open position when said cap is moved from said inoperative position to said operative position, said safety valve means adapted to engage said valve of the inner tube of the tire during its movement from said closed position thereof to said open position thereof to open the valve of the inner tube of the tire when said safety valve means is in open position so that air under pressure may flow through the valve of the inner tube of the tire and said safety valve into the interior of said dust cap; second spring means engaging said plug and said safety valve means and tending to move said safety valve means to said closed position thereof; an elongated piston mounted for sliding movement in said dust cap and having an end wall facing the open end thereof and a cylindrical wall engaging with the outer surface thereof the inner surface of said dust cap so as to be guided thereby whereas the inner surface of said cylindrical wall being slightly spaced from the outer surface of said hollow cylindrical member; and third spring means located between said closed end of said dust cap and said end wall of said elongated piston so that when said dust cap is moved to said operative position thereof and air under pressure passes through said valve the inner tube of the tire and said safety valve means said elongated piston is moved against the action of said third spring means to indicate the air pressure in the tire.

References Cited in the file of this patent

UNITED STATES PATENTS

| | | |
|---|---|---|
| 1,156,268 | Bromberg | Oct. 12, 1915 |
| 1,220,272 | Pollock | Mar. 27, 1917 |
| 1,482,237 | Lent | Jan. 29, 1924 |
| 1,494,001 | McPherson | May 13, 1924 |
| 1,894,372 | Fleck | Jan. 17, 1933 |

FOREIGN PATENTS

| | | |
|---|---|---|
| 29,135 | Great Britain | Dec. 15, 1910 |